No. 661,062. Patented Nov. 6, 1900.
W. C. MARSH.
AUTOMATIC WEIGHER.
(Application filed July 10, 1899.)

(No Model.) 3 Sheets—Sheet 1.

Attest
Ina Graham
Nora Graham

Inventor.
W. C. Marsh.
by L. P. Graham
his attorney

No. 661,062. Patented Nov. 6, 1900.
W. C. MARSH.
AUTOMATIC WEIGHER.
(Application filed July 10, 1899.)
(No Model.) 3 Sheets—Sheet 2.

Attest
Ina Graham.
Nora Graham.

Inventor.
W. C. Marsh
by L. P. Graham
his attorney

No. 661,062. Patented Nov. 6, 1900.
W. C. MARSH.
AUTOMATIC WEIGHER.
(Application filed July 10, 1899.)

(No Model.) 3 Sheets—Sheet 3.

Attest
Ina Graham
Nora Graham

Inventor
W. C. Marsh.
by L. P. Graham
his attorney

UNITED STATES PATENT OFFICE.

WILLIAM C. MARSH, OF FORT MADISON, IOWA, ASSIGNOR OF ONE-THIRD TO THE CHAMBERS, BERING, QUINLAN COMPANY, OF DECATUR, ILLINOIS.

AUTOMATIC WEIGHER.

SPECIFICATION forming part of Letters Patent No. 661,062, dated November 6, 1900.

Application filed July 10, 1899. Serial No. 723,326. (No model.)

*To all whom it may concern:*

Be it known that I, WILLIAM C. MARSH, of the city of Fort Madison, county of Lee, and State of Iowa, have invented certain new and useful Improvements in Automatic Weighers, of which the following is a specification.

This invention relates to weighers in which the receptacle carrying the load to be weighed and dumped is pivotally supported at one side, as in rotary weighers, and it resides in part in a detaining trip or trigger adjustable to and from the pivot of the receptacle and a radial rib or ribs on an end of the receptacle, whereby the weight at which the receptacle dumps may be varied by shifting the trip instead of by shifting a weight on a scale-beam in the usual way.

Another prominent feature of the invention resides in means for accelerating the movement of the trip as the load begins to dump, so that there may be no wavering or hesitating in the dumping motion and so that the dump may be quickly effected.

Another feature of the invention resides in means for impeding the flow of grain to the weigher during a dumping movement, and still other features reside in the details hereinafter particularized in the specification and set forth in the claims.

Figure 1:
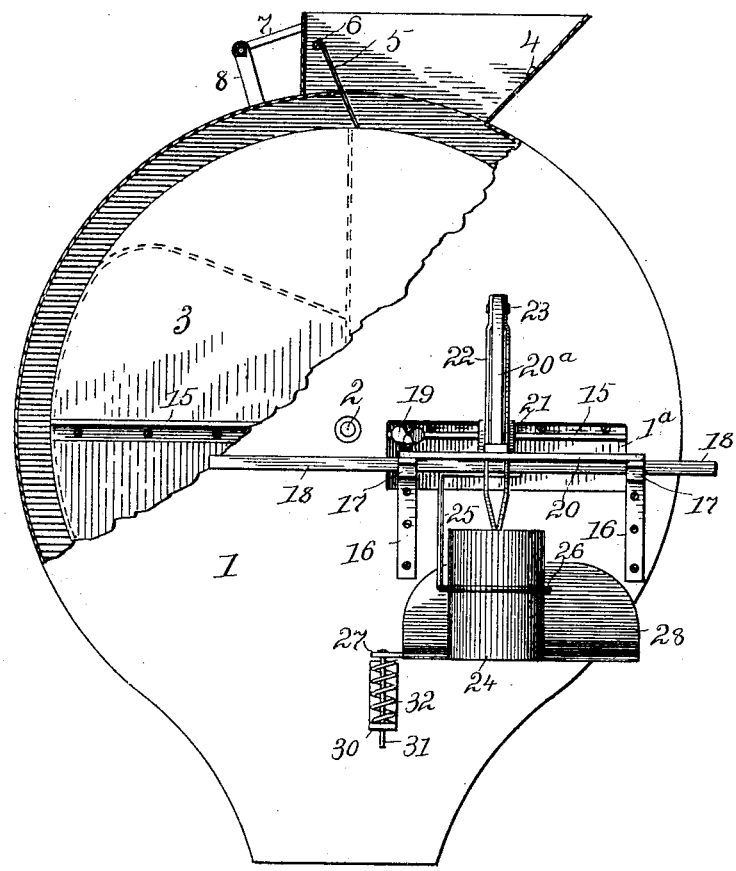
Figure 2:
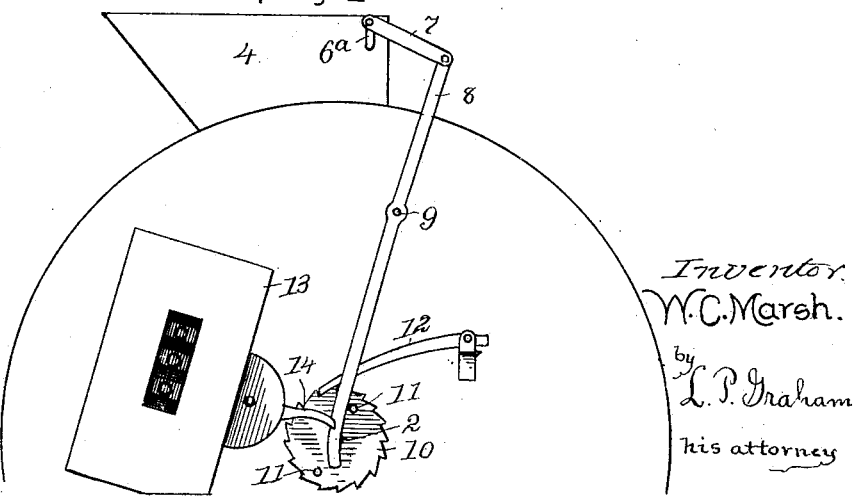
Figure 3:
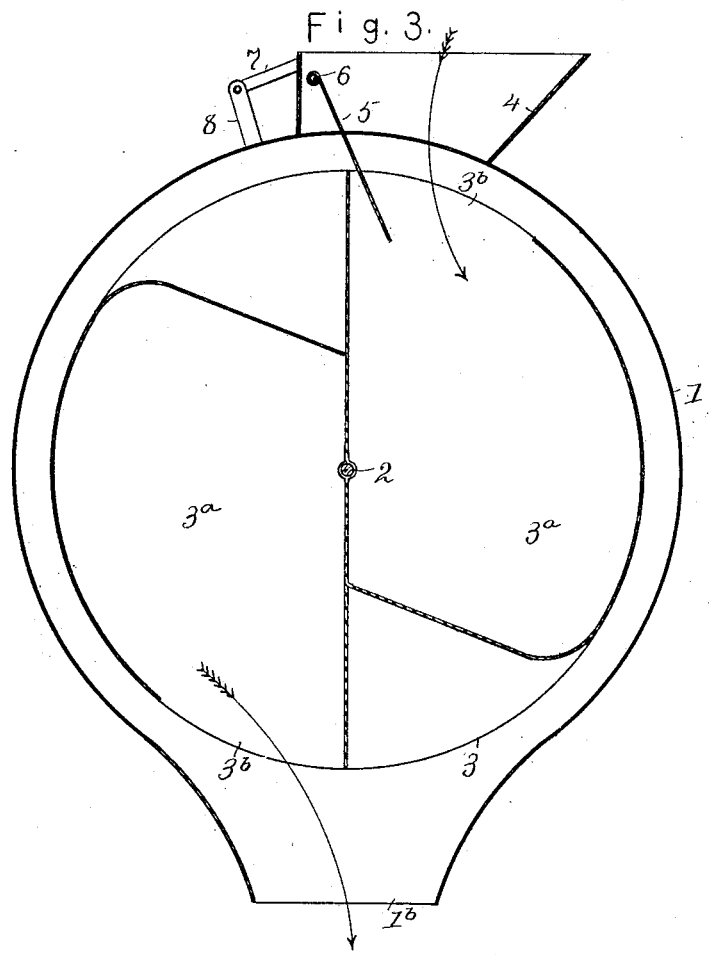
Figure 4:
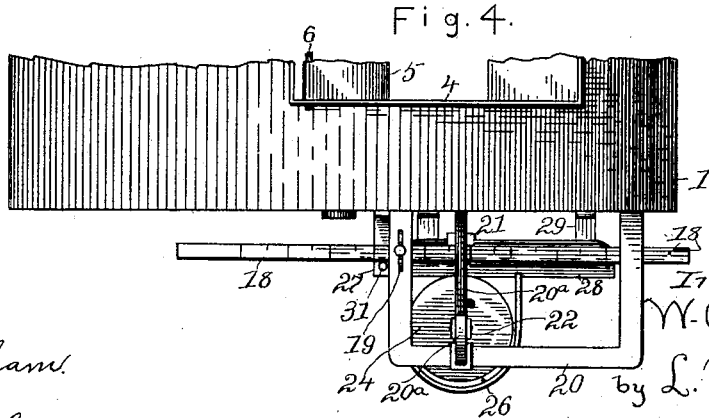
Figure 5:
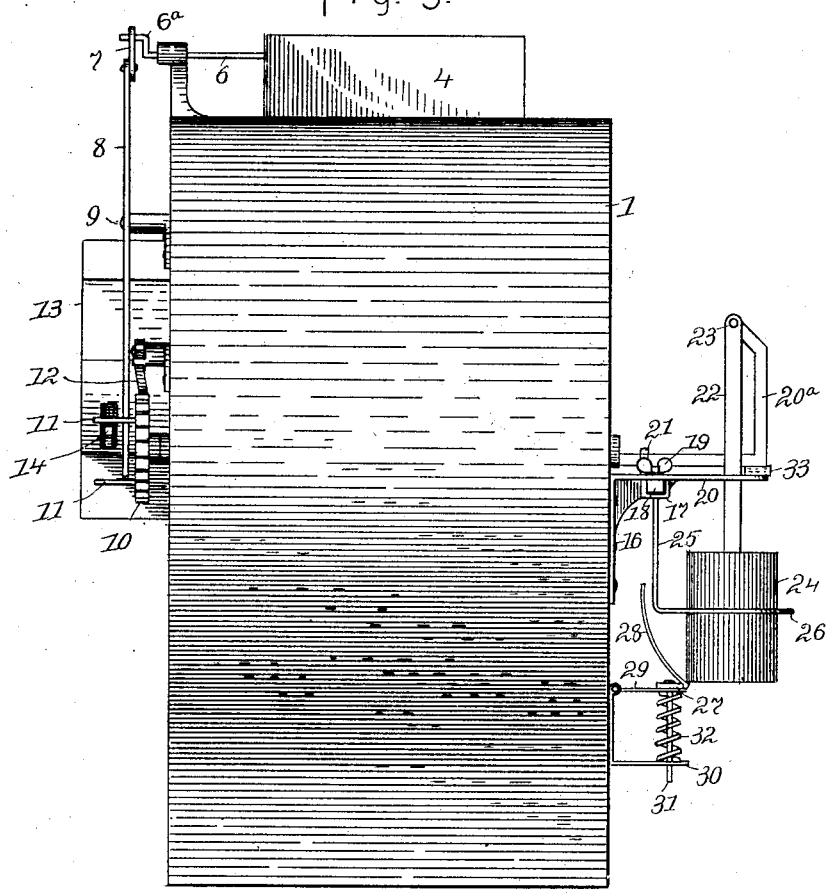
Figure 6:
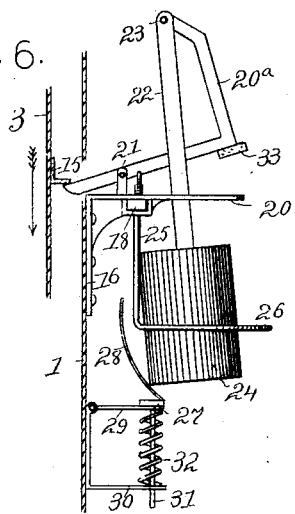

In the drawings forming part of this specification, Figure 1 is a side elevation of a weigher embodying my invention, a part of the casing being broken away. Fig. 2 is a side elevation of the upper part of the weigher, showing the side opposite to that shown in Fig. 1. Fig. 3 is a vertical section from side to side through the weigher. Fig. 4 is a plan of the weighing mechanism and a fragment of the weigher-casing. Fig. 5 is an elevation showing an edge or narrow side of the weigher. Fig. 6 is a detail illustrative of the operation of the weighing mechanism.

The casing or frame of the weigher is shown in its preferred form at 1, although its form is not essential. It has a contracted outlet or spout at its lower end, as shown at $1^b$ in Fig. 3, and it has a horizontal side slot near its center, as shown at $1^a$ in Fig. 1. A shaft, as 2, is journaled in the side walls of the casing, and on the shaft inside the casing is fastened a rotating frame 3, which is divided into a plurality of grain-receiving buckets, as $3^a$, having mouths or openings $3^b$. A hopper 4 is built onto the upper surface of the casing 1, and it communicates with the interior of the casing through an opening in the upper part thereof. A flap-valve 5 is fastened on a rod 6, which crosses the hopper at one side thereof, and the valve may either hang downward into the casing, as shown in Figs. 1 and 3, or be swung upward to obstruct passage of grain from the hopper to the buckets in the casing. One end of rod 6 extends beyond the casing and is cranked at its projecting end, as shown at $6^a$. The cranked end of the rod connects with an oscillating bar 8 through a link 7. The bar 8 is pivoted on a side of the casing at 9, and its lower end terminates adjacent to a wheel 10, which is fixed on a projecting end of shaft 2. The wheel has pins, as 11, projecting from its outer face, one pin for each bucket-compartment, and it is toothed on its periphery and provided with a pawl 12 to prevent backlash. The pins are so placed on the wheel with relation to the bucket-compartments that whenever the bucket-frame begins to rotate to carry a filled bucket to a discharging position a pin will engage bar 8 and by pushing it aside act on the valve 5 through link 7 and crank $6^a$, causing the valve to rise and impede passage of grain while the filled bucket is swinging to a discharging position and an empty bucket is presenting its mouth to the hopper.

A register or tally-box, as 13, may be attached to the casing adjacent to the wheel 10, with its actuating-arm projecting into the path of pins 11, in which case the register will be advanced one point at each partial rotation of the bucket-frame.

On the side of casing 1 opposite the tally-box is fastened a pair of brackets 16. These are placed slightly below and to one side of the shaft 2, both being in the same horizontal plane. A bar 20 is supported by the brackets, and it extends outward from one bracket along the casing parallel therewith to a point opposite the other bracket, where it turns inward to such other bracket. The brackets and the bar, with whatever braces are needed to give stability, constitute the supporting-frame for the weighing mechanism, and the form and arrangement shown in the drawings may be modified materially without affecting the principle of my invention.

A rod or bar 18 has sliding bearings in the brackets 16, as shown at 17 in Fig. 1, and a set-screw 19, set through bar 20 in position to engage bar 18, shows one way in which the bar 19 may be held from sliding in the supporting-frame. Lugs 21 on bar 18 provide a fulcrum for the bell-crank trip-lever 20ª, which lever is extended horizontally, or approximately so, from a point inside casing 1 to the outer extension of bar 20, thence upward and then inward toward the casing—that is to say, the detaining-arm of the lever is horizontal, but its weighted arm extends upward and inclines slightly inward. At the upper end of the trip-lever straps 22 are swung on a pivot 23, and the straps extend below the supporting-bar 20 and carry a weight 24 on their lower ends. The end of the horizontal part of the lever extends through slot 1ª of casing 1 and terminates adjacent to the bucket-frame 2. The bucket-frame has radial strips 15 projecting from its sides, and these engage the end of the horizontal part of the trip-lever and are held thereby against rotary motion in an operative direction so long as the lever remains in the position shown in Figs. 1 and 5. The lever rests with its weighted end on bar 20 while sufficient grain is accumulating to overbalance the weight, and when this is done the inner end of the beam will be forced downward, as shown in Fig. 6, thereby raising the weight and carrying its connection with the lever very rapidly over the fulcrum 21. The weight firmly resists downward motion of the filling-bucket until the required amount has accumulated; but when the trip once starts it loses its leverage so rapidly as to permit a quick unfaltering discharge movement in the bucket-frame.

The bar 18 is shiftable lengthwise, so as to carry the trip-lever nearer to or farther from the shaft on which the buckets rotate, thus decreasing or increasing the amount of grain required to start the trip. This bar may be graduated to show proper points of adjustment for a required quantity of different grains, and when set it may be held in position by set-screw 19 or other suitable means.

To prevent the weight from swinging excessively, a rod is extended downward from bar 18, as shown at 25, and bent around the weight, as shown at 26. This prevents extreme swing of the weight sidewise and away from the casing, but does not interfere with its swing toward the casing as the trip moves.

To permit the weight to swing toward its fulcrum as it rises, while assuring its return to its proper position when it falls, the inclined plate 28 is placed with its lower edge adjacent to the lower inner edge of the weight when the weight is down and with its face inclined upward and inward. This will permit the weight to travel obliquely toward its fulcrum, as shown in Fig. 6, and will compel it to assume a position directly under its connection with the beam when it is down. To facilitate this operation, the plate 28 may be carried on hinged straps 29 and be sustained by a spring or springs. One way to employ a spring to yieldingly support the plate is to provide a lug, as 30, extended rigidly from the casing under the strip 27, which carries the plate, extend a rod, as 31, from the plate through a hole in the lug, and place a spring 32 on the rod between the plate and the lug. By this or similar provision the plate may yield to sudden motion of the weight and afterward assert the force of the spring to bring the weight to place.

To deaden the clash of the scale-beam against the supporting-bar, an elastic block 33 is attached to the beam in position to strike against the bar and act as a buffer.

In operation the bar 18 is set in proper position and grain is supplied to a bucket through hopper 4. When the trip starts, the bucket-frame rotates with rapidly-accelerating speed, the wheel 10 acts on lever 8 to close or obstruct the passage from the hopper to the bucket, which may be readily done without drawing too heavily on the momentum of the bucket-frame, and later the arm of the register is forced by a pin of the wheel in a direction to tally the discharge of the bucket. By the time the bucket reaches the discharging position the weight has reassumed its weighing position, and the inner end of the beam engages with another rib on the bucket-frame and arrests rotation, while the pawl 12 acts on the toothed periphery of wheel 10 to prevent backlash. While one bucket is emptying another is filling, and so the operation is carried on rapidly without impairing the accuracy of the weighing.

What I claim is—

1. The combination with a pivotally-supported weighing-receptacle having a radial rib, of a receptacle-detaining trip adjustable to and from the pivot of the receptacle and engageable with the rib at various points along the same.

2. The combination with a pivotally-supported weighing-receptacle having a radial rib, of a weighted receptacle-detaining trip adjustable to and from the pivot of the receptacle and engageable with the rib at various points along the same.

3. In a scale appliance for automatic weighers, the combination of a pivotally-supported weighing-receptacle having a radial rib, a slide adjustable to and from the pivot of the receptacle and a receptacle-detaining trip-lever fulcrumed on the slide crosswise thereof and engageable with the rib of the receptacle.

4. In a scale appliance for automatic weighers, the combination of a slidable bar, a trip-lever fulcrumed crosswise of the slidable bar with its weighted end turned upward, a weight swung from the upturned end of the lever and an inclined plate against which the weight may move in rising and falling.

5. In a scale appliance for automatic weighers, the combination of a slidable bar, a triplever fulcrumed crosswise of the slidable bar with its weighted end upturned, a weight swung from the upturned end of the lever and a yielding plate against which the weight may move in rising and falling.

In testimony whereof I sign my name in the presence of two subscribing witnesses.

WILLIAM C. MARSH.

Witnesses:
Y. H. MEERIANS,
P. A. EMMONS.